(12) United States Patent
Yang

(10) Patent No.: US 10,079,751 B2
(45) Date of Patent: Sep. 18, 2018

(54) FLEXIBLE NETWORK BUILDING METHOD FOR REMOTE-PROGRAMMABLE MONITORING AND CONTROLLING SYSTEM APPLIED TO SMART HOME

(71) Applicant: Link Advance Co., Ltd., Taoyuan (TW)

(72) Inventor: Ting-Wei Yang, Hsinchu (TW)

(73) Assignee: Link Advance Co., Ltd., Taoyuan (TW)

( * ) Notice: Subject to any disclaimer, the term of this patent is extended or adjusted under 35 U.S.C. 154(b) by 219 days.

(21) Appl. No.: 15/263,269

(22) Filed: Sep. 12, 2016

(65) Prior Publication Data

US 2017/0006109 A1 Jan. 5, 2017

Related U.S. Application Data

(63) Continuation of application No. PCT/CN2015/073934, filed on Mar. 10, 2015.

(30) Foreign Application Priority Data

Mar. 12, 2014 (CN) .......................... 2014 1 0090360

(51) Int. Cl.
   *H04L 12/28* (2006.01)
   *H04L 12/751* (2013.01)
   *H04L 12/24* (2006.01)

(52) U.S. Cl.
   CPC .......... *H04L 45/02* (2013.01); *H04L 12/2803* (2013.01); *H04L 12/2818* (2013.01); *H04L 12/283* (2013.01); *H04L 41/08* (2013.01)

(58) Field of Classification Search
   CPC ..... H04L 12/28; H04L 12/2818; H04L 41/08; H04L 43/0817; G08C 17/00
   See application file for complete search history.

(56) References Cited

U.S. PATENT DOCUMENTS

| 2004/0158333 A1* | 8/2004 | Ha | .......................... H04B 3/542 |
| | | | 700/3 |
| 2004/0208117 A1* | 10/2004 | Kim | .................... H04L 12/2803 |
| | | | 370/216 |

(Continued)

FOREIGN PATENT DOCUMENTS

| CN | 101166163 A | 4/2008 | ............. H04L 12/28 |
| CN | 101794500 A | 8/2010 | ............. H04L 29/08 |

(Continued)

OTHER PUBLICATIONS

103108743 Taiwan Search Report, dated May 18, 2015.
PCT/CN2015/073934, International Search Report, PCT/ISA/210, dated Jul. 2009.

*Primary Examiner* — Shirley Zhang
(74) *Attorney, Agent, or Firm* — Martine Penilla Group, LLP

(57) ABSTRACT

A flexible network building method for a remote-programmable monitoring and controlling system including an intelligent network device, a local area network router, and a dominant host in communication with the local area network router, including: sending a dominant host beacon containing router connection data for the local area network router through the dominant host; the intelligent network device receiving the dominant host beacon sent from the dominant host, and logining to the local area network router; the dominant host logining to the intelligent network device; sending a control command to the intelligent network device through the dominant host; receiving and executing the control command using the intelligent network device; and the intelligent network device responding to the dominant host with an executing status message after the execution of the control command.

18 Claims, 6 Drawing Sheets

(56) References Cited

U.S. PATENT DOCUMENTS

| | | | |
|---|---|---|---|
| 2005/0232301 A1* | 10/2005 | Lee | H04L 12/2807 370/464 |
| 2005/0234568 A1* | 10/2005 | Chung | H04L 12/2803 700/90 |
| 2008/0279202 A1 | 11/2008 | Choi et al. | 370/401 |
| 2010/0148940 A1* | 6/2010 | Gelvin | H04L 67/12 340/286.02 |
| 2012/0079096 A1* | 3/2012 | Cowan | G06F 11/3006 709/224 |
| 2013/0077664 A1 | 3/2013 | Lee | 375/222 |
| 2015/0185261 A1* | 7/2015 | Frader-Thompson | G01D 4/002 702/61 |

FOREIGN PATENT DOCUMENTS

| | | | | |
|---|---|---|---|---|
| CN | 101794501 A | 8/2010 | | G08C 17/02 |
| CN | 101859134 A | 10/2010 | | G05B 19/418 |
| CN | 102291284 A | 12/2011 | | H04L 12/28 |
| CN | 102932627 A | 2/2013 | | H04N 7/18 |
| CN | 102934397 A | 2/2013 | | H04L 12/28 |
| TW | 201109872 A | 3/2011 | | G05B 19/02 |
| TW | 201111927 A | 4/2011 | | G05B 19/02 |
| TW | 201347591 A | 11/2013 | | H04L 12/24 |

\* cited by examiner

FLEXIBLE NETWORK BUILDING METHOD FOR REMOTE-PROGRAMMABLE MONITORING AND CONTROLLING SYSTEM APPLIED TO SMART HOME

This application is a continuation application of, and claims priority to, PCT Application No. PCT/CN2015/073934, filed on Mar. 10, 2015, which claimed priority to Chinese Application No. 201410090360.5, filed on Mar. 12, 2014; and to Taiwanese Application No. 103108743, filed on Mar. 12, 2014, all of which are incorporated herein by reference in their entireties.

BACKGROUND OF THE INVENTION

Technical Field

The present invention relates to a flexible network building method, and particularly to a flexible network building method for remote-programmable monitoring and controlling system applied to smart home.

Description of the Prior Art

In conventional smart home systems, it is necessary for all networked electrical appliances to function via the control of a specific, dedicated central server host, and these networked electrical appliances are often different from the central server host in software (or firmware) and hardware. For example, preset controlling procedures must be stored in advance in the central server host, the central server host itself does not belong to the networked electrical appliances, processing procedures corresponding to the controlling procedures of the central server host have to be stored in the networked electrical appliances in advance, etc. Therefore, there is only little flexibility in utilizing these networked electrical appliances and such central server host, and thus different changes in controlling cannot be immediately made in response to users' requirements. For example, in the case that a central server host is initially configured to separately control the actuation of a networked electrical appliance A and a networked electrical appliances B, if an user wants to simultaneously control the networked electrical appliances A and B through the central server host, the user have to contact the supplier of the smart home system to re-setup the controlling procedures of the central server host as well as the processing procedures of these networked electrical appliances, then the networked electrical appliances A and B can be controlled simultaneously through the central server host. In addition, when modifying the configuration, the addition or changing of networked devices has to be performed by the supplier of the smart home system, or performed with special auxiliary equipment and special skills. Because preforming the procedure of modifying the setting of the central server host usually requires the help of people in this professional field (such as the smart home system suppliers) or additional specialized devices, this would cause significant inconvenience to ordinary users (especially the elderly and children), and it is also the case for the maintenance of the central server host. In addition, it is necessary for these networked electrical appliances to be used in conjunction with a specific, dedicated central server host. In other words, the networked electrical appliances are incompatible with other central server hosts when being connected to other network domains. Therefore, it is difficult to integrate these networked electrical appliances into the diversifying applications of smart home systems.

In view of this, there is an urgent need for a flexible network building method for remote-programmable monitoring and controlling system applied to smart home, which allows users to establish their own proprietary smart home environment in a more convenient and flexible manner, and allows users to, via such remote-programmable monitoring and controlling system, remotely control and monitor one or more electrical appliances and/or one or more detectors connected to the remote-programmable monitoring and controlling system, thereby establishing an intelligent environment which allows interactions with the aforementioned remote-programmable monitoring and controlling system.

SUMMARY OF THE INVENTION

In order to solve the aforementioned problems, according to an embodiment of the present invention, a flexible network building method for remote-programmable monitoring and controlling system applied to smart home is provided. The remote-programmable monitoring and controlling system includes an intelligent network devices, a local area network router, and a dominant host in communication with the local area network router. The method includes: sending a dominant host beacon via the dominant host, wherein the dominant host beacon contains router connection data for the local area network router; the intelligent network devices receiving the dominant host beacon sent from the dominant host for logining to the local area network router with the router connection data; the dominant host logining to the intelligent network device; sending a control command to the intelligent network device through the dominant host; receiving and executing the control command using the intelligent network device; and the intelligent network device responding to the dominant host with an executing status message after the execution of the control command.

According to another embodiment of the present invention, a flexible network building method for remote-programmable monitoring and controlling system applied to smart home is provided. The remote-programmable monitoring and controlling system comprises a plurality of intelligent network devices, a local area network router, and a dominant host in communication with the local area network router. The method comprises: sending a dominant host beacon via the dominant host, wherein the dominant host beacon contains router connection data for the local area network router; all of the intelligent network devices receiving the dominant host beacon sent from the dominant host, so as to login to the local area network router using the router connection data, wherein each of the intelligent network devices has a master communication channel and a node communication channel; randomly designating one of the plurality of intelligent network devices as a local area host, and designating the other ones of the plurality of intelligent network devices as slave nodes, wherein the master communication channel and node communication channel of the local area host are set to ON, the node communication channels of the slave nodes are set to ON, the master communication channels of the slave nodes are set to OFF, and wherein the communication resolution between the local area host and the slave nodes is made via the node communication channels by way of polling or broadcasting call signs; the dominant host logining to the local area host, such that the dominant host marks the address of the local area host, and sends a slave node identity response command to the local area host, wherein the local area host is in communication with the dominant host via the master communication channel; using the local area host to receive the slave node identity response command sent from the dominant host, and then send the slave node identity response command to all of the intelligent network devices; and after receiving the slave node identity response command, the slave nodes responding to the dominant host with slave node status messages via the local area host.

According to the method of the present invention, an ordinary home may be modified to a desired smart home in a low-cost and simple manner through DIY, without any requirement of relevant technical ability. Just like multi-socket adaptors which can be easily obtained in hypermarkets, the intelligent devices of the present invention are affordable, easy to use, and highly flexible in customization, enabling a home to meet the requirements of the families better. This not only allows the so-called smart homes to no longer be expensive systems or equivalent to luxury residences, but also gets rid of technical and/or financial obstacles which ordinary families often encounter when establishing smart homes. This also enables the practice of smart homes to expand downward from the top class. Therefore, the intelligent network devices of the present invention may be introduced to ordinary families to create new home demands and stimulate more creations regarding smart homes, allowing more families to continuously evolve toward the objective of being safer, more comfortable and smarter. With the aforementioned spirit, the intelligent network devices of the present invention belong to all-purpose devices, which are easy to be embedded in third-party controllers. In the case that such intelligent network devices are combined with electrical appliances produced by appliance manufacturers, the intelligent network devices of the present invention can be further embedded in the controllers of these electrical appliances, such that these electrical appliances can be upgraded to real smart electrical appliances. Furthermore, since the intelligent network devices of the present invention belong to all-purpose devices, the manufacturing cost thereof can be significantly reduced with the increase in the yield of such intelligent network devices. Thus, the difference of smart electrical appliances and conventional electrical appliances in retail price can be reduced, which is helpful in the popularization of smart homes.

Other aspects and advantages of the present invention may be more obvious from the following detailed description in conjunction with the accompanying drawings illustrating the principles and examples of the present invention. Additionally, well-known components and principles will not described in detail in the present disclosure, in order not to unnecessarily obscure the present invention.

DETAILED DESCRIPTION OF THE PREFERRED EMBODIMENTS

Figure 1:
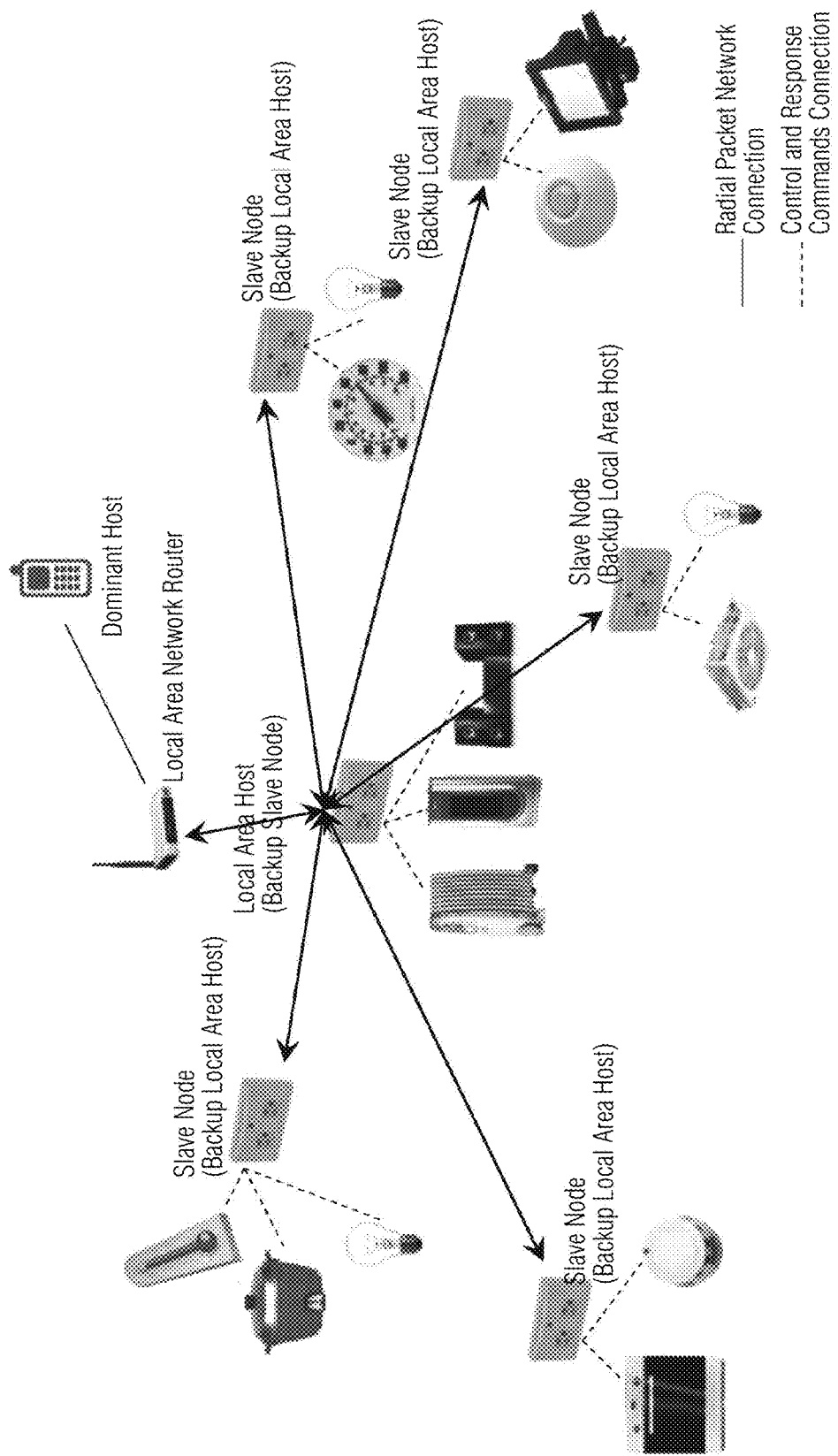
FIG. 1 is a schematic structural view illustrating a remote-programmable monitoring and controlling system applied to smart home, according to an embodiment of the present invention.

FIG. 1 is a schematic structural view illustrating a remote-programmable monitoring and controlling system applied to smart home, according to an embodiment of the present invention. As shown in FIG. 1, this remote-programmable monitoring and controlling system may include one or more intelligent network devices set up at home. An user may designate one of the intelligent network devices as a local area host, and the other ones as slave nodes, wherein the local area host may be used as a backup slave node, while the slave nodes may be used as backup local area hosts. Thus, the master-slave relationship among these intelligent network devices is not constant, and can be designated based on the users' actual requirements.

Such remote-programmable monitoring and controlling system further comprises a local area network router and a dominant host in communication with the local area network router. In an embodiment of the present invention, the dominant host may be but not limited to a portable dominant host, such as a smart phone, a smart watch, a laptop (notebook computer), a personal digital assistant (PDA), a tablet, etc., or may be a fixed dominant host, such as a personal computer (PC), etc. The intelligent network devices can be connected to one or more household appliances (such as microwave ovens, refrigerators, air-conditioning systems, timers, video monitors and so on, but not limited thereto) and/or one or more detection devices (such as smoke sensors, light sensors, thermometers, hygrometers, etc., but not limited thereto).

With the remote-programmable monitoring and controlling system of the present invention, the user may remotely control and monitor the household appliances and/or detectors through the dominant host. In addition, through the dominant host, the user may be able to set up the interlocking relationship among the household appliances and/or detectors in a programmable manner. For example, the user can set up the interlocking relationship among a microwave oven, an audio system, and smoke detectors through the dominant host in a programmable manner, so that the interlocking operation among the microwave oven, the audio system, and the smoke detectors can be performed when the user sends controlling commands through the dominant host.

Figure 2:
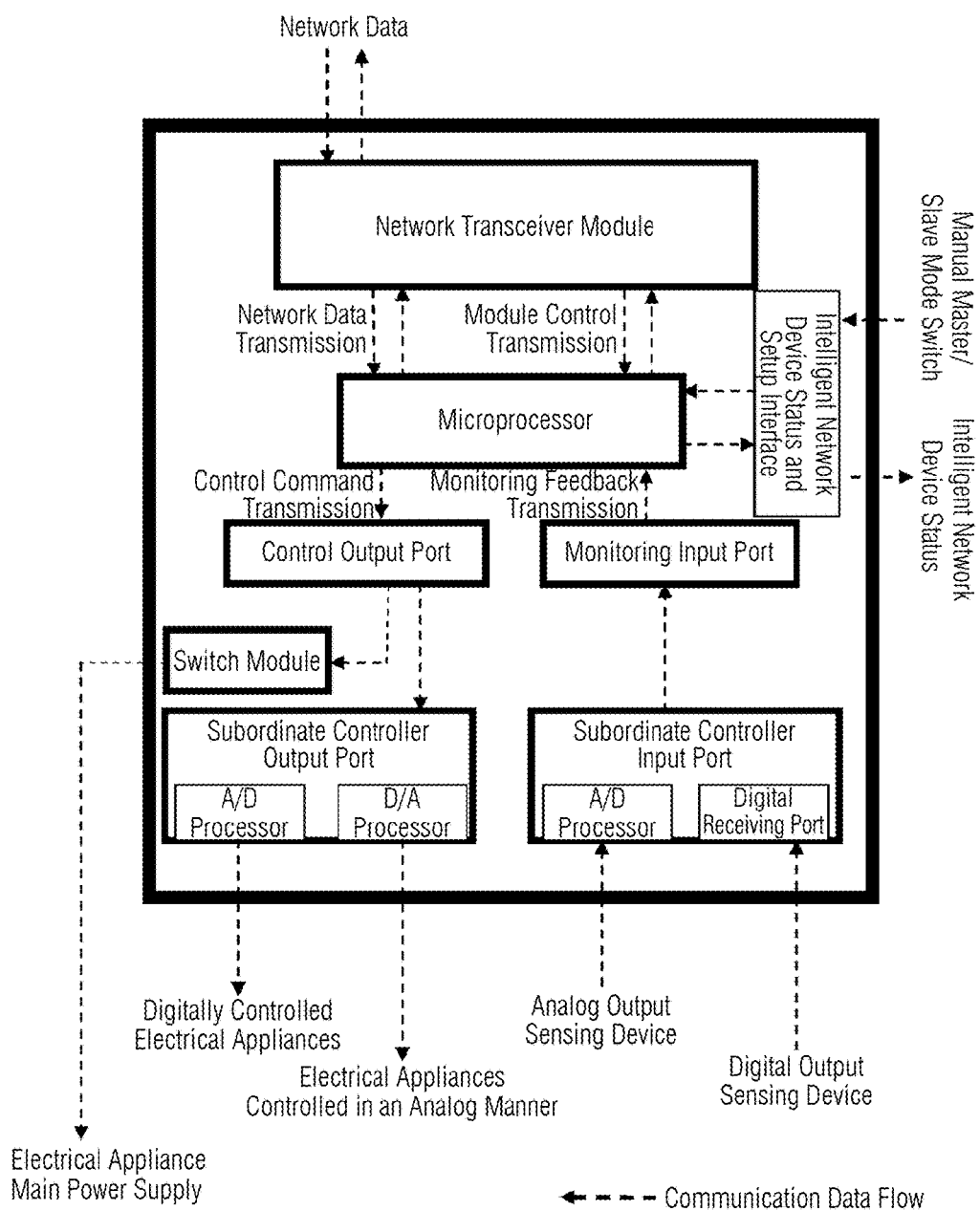
FIG. 2 is a schematic structural view of an intelligent network device according to an embodiment of the present invention.

FIG. 2 is a schematic structural view of an intelligent network device according to an embodiment of the present invention. As shown in FIG. 2, the intelligent network device may include a network transceiver module, a microprocessor, an intelligent network device status and setup interface, a control output port, a switch module, a subordinate controller output port, a monitoring input port, and a subordinate controller input port. The subordinate controller output port may comprise an A/D processor signally connected to digitally controlled electrical appliances (such as, but not limited to, digitally controlled microwave ovens), and a D/A processor connected to electrical appliances controlled in an analog manner (such as, but not limited to, lamps which are controlled in an analog manner). The subordinate controller input port may comprise an A/D processor signally connected to analog output sensing device (such as, but not limited to, analog temperature sensors), and a digital receiving port signally connected to digital output sensing devices (such as, but not limited to, digital temperature sensors). An intelligent network device status monitor may be signally connected to the intelligent network device status and setup interface, thereby displaying the status of the intelligent network device. The intelligent network device status and setup interface may be signally connected to a manual master/slave mode switch, so that the intelligent network device can be designated as a local area host or a slave node through the switching of the manual master/slave mode switch. The switch module may be signally connected to an electrical appliance main power supply of the digitally controlled electrical appliances and an electrical appliance main power supply of the electrical appliances controlled in an analog manner. Here, the term "signally connected" refers to a connection formed via the transmission of signals between devices, and it is not limited to the physical or non-physical connections between the devices.

The network transceiver module may be used for receiving and transmitting signals, data, etc. In the present invention, the network transceiver module may provide a master communication channel and a node communication channel. The master communication channel may be a transmission protocol using information link strict-priority, such as, but not limited to, a Transmission Control Protocol (TCP) communication protocol channel. The node communication channel may be a transmission protocol using information link efficient-priority, such as, but not limited to, an User Datagram Protocol (UDP) communication protocol channel. In the present invention, the master and node communication channels of the intelligent network device used as the local area host are set to ON; while the node communication channel of the intelligent network device used as a slave node is set to ON, and the master communication channel thereof is set to OFF. The local area host communicates with the dominant host via the master communication channel, while the communication resolution between the local area host and the slave node is made via the node communication channel by way of polling or broadcasting call signs. Therefore, the slave node does not communicate directly with the dominant host, i.e., all data between the slave node and the dominant host has to be transmitted through the local area host. The slave node responds its identity and control status via the node communication channel. In addition, the data packets transmitted by each intelligent network device on these communication channels have a consistent protocol format, so that all intelligent network devices can use the same data analysis program.

In FIG. 2, when the intelligent network device is used as a local area host, the network transceiver modules may receive network data (that is, communication data) sent from the dominant host and the slave node, and transmit the data generated by the microprocessor thereof and the network data sent from the slave node to the dominant host. Conversely, when the intelligent network device is used as a slave node, the network transceiver module thereof may receive network data sent from the dominant host and transmitted by the local area host, and transmit the data generated by the microprocessor thereof to the local area host, with this data then being transmitted to the dominant host by the local area host.

The microprocessor may be used to the transmitting and receiving operations of the network transceiver module. In addition, the microprocessor may be used to analyze the network data from the dominant host to determine whether the network data is valid (for example, analyze the network data to check whether the check codes contained in the network data match a predetermined format, or whether the device authorization codes contained in the network data is correct, etc.). If the network data is determined to be invalid, it will be ignored. If the network data is determined to be valid, it is further analyzed to determine whether the network data relates to the intelligent network device itself (for example, analyze the network data to determine whether the destination IP address string contained in the network data is consistent with the IP address of the intelligent network device assigned by the local area network router, etc.). If the network data is determined to be irrelevant to the intelligent network device itself, it will be ignored. If the network data is determined to be relevant to the intelligent network device, the content of the network data is executed. For example, the dominant host sends a control command to a local area host A, and the local area host A further distributes the control command from the dominant host to slave nodes B, C, and D. Meanwhile, the microprocessors of the local area host A and all slave nodes B, C and D may start to analyze the control command from the dominant host, so as to determine whether the control command is valid (for example, examine the check codes, device authorization codes, etc. contained in the control command). If the local area host A and the slave nodes B and C determine that the control command is invalid, but the slave node D determines that the control command is valid, the local area host A and the slave nodes B and C will ignore the control command, and the slave node D further determines whether the control command is relevant to the device being the slave node D (for example, examine the destination IP address string contained in the control command, etc.). The control command will be ignored if it is determined to be irrelevant to the device being the slave node D, while the content of the control command will be executed if the control command is determined to be relevant to the device being the slave node D. In other words, the microprocessor of the slave node D may transmit the control command to the switch module via the control output port, thereby turning on or off the electrical appliance main power supply of a digitally controlled electrical appliances or an electrical appliances controlled in an analog manner. Alternatively, the microprocessor of the slave node D may transmit the control command to the subordinate controller output port via the control output port, and then send the control command to a digitally controlled electrical appliances or an electrical appliances controlled in an analog manner, thereby controlling the operational conditions of the digitally controlled electrical appliances or the electrical appliances controlled in an analog manner (e.g. performing digital control adjustment for the power or activation time of a microwave oven, analog control adjustment for lamp brightness, etc.). In addition, in the case that the control command is an identity response command, the slave node D may send a slave node status message to the local area host A, then the slave node status message from the slave node D may be sent to the dominant host via the local area host A.

a check code table is stored in each intelligent network device. The check code table includes various predetermined check codes. The check code contained in the network data is recorded at a fixed address in the packet of the network data. The check code may be used to, for example, represent the summary of the entire packet. For example, 0xFA12 represents that the packet is a control command packet, 0xFB14 represents that the packet is a response data packet, 0xFC66 represents that the packet is a handshake packet, 0xFDFF represents that the packet is a global response requesting packet, 0xFD65 represents that the packet is a specific slave response requesting packet, etc., but it is not limited thereto. When an intelligent network device determines whether the check code recorded in the network data valid, it will analyze the check code contained in the network data to check whether the check code is recorded at a fixed address in the network data packet, and verify whether the check code contained in the network data matches the specific check code in the check code table. If the two conditions set forth above cannot be both met, the check code is determined to be invalid, and the network data is ignored. The purpose of using check codes is to prevent accidental misjudgment for similar packets throughout the network transmission. In addition, in the control program for an individual intelligent network device, the next program to be called may be known from the check code. If the check code is invalid, there will be no basis for calling the device programs, so the intelligent network device will disregard the network data carrying such invalid check code.

Each intellectual network device have its own device authorization code. The authorization codes of the intelligent network devices may be pre-stored in the dominant host. When the dominant host sends a control command to an intelligent network device, the device authorization code of the intelligent network device will be recorded at a specific address in the control command packet. As the intelligent network device receives the control command, it analyzes the control command to determine whether the device authorization code in the control command matches the device authorization code of the intelligent network device itself. If yes, the control command is determined to be valid, and if no, the control command is determined to be invalid and will be ignored.

In addition to a "control" function, the intelligent network device may also have a "monitoring" function. For example, the A/D processor of the subordinate controller input port of the intelligent network device may receive analog monitoring signals from the analog output sensing device, and the digital receiving port of the subordinate controller input port of the intelligent network device may receive digital monitoring signals from the digital output sensing device. Then, the received monitoring signals are fed back to the microprocessor through the monitoring input port, and sent to the dominant host by the network transceiver module (through the local area host). For example, a digital temperature sensor may transmit a temperature monitoring signal to the subordinate controller input port, then the temperature monitoring signal is fed back to the microprocessor through the monitoring input port, and sent to the dominant host by the network transceiver module (through the local area host).

The flexible network building method for remote-programmable monitoring and controlling system applied to smart home according to the present invention may include, but is not limited to: a local area host setting process, an intelligent network automatic construction process, and an intelligent network programmable controlling and monitoring process. These processes will be described below in detail with reference to the embodiments shown in FIG. 3 to FIG. 6. It can be understood that the flow charts shown in FIG. 3 to FIG. 6 are proposed for the purpose of illustration, and should not be construed as limitations to the present invention.

Figure 3:
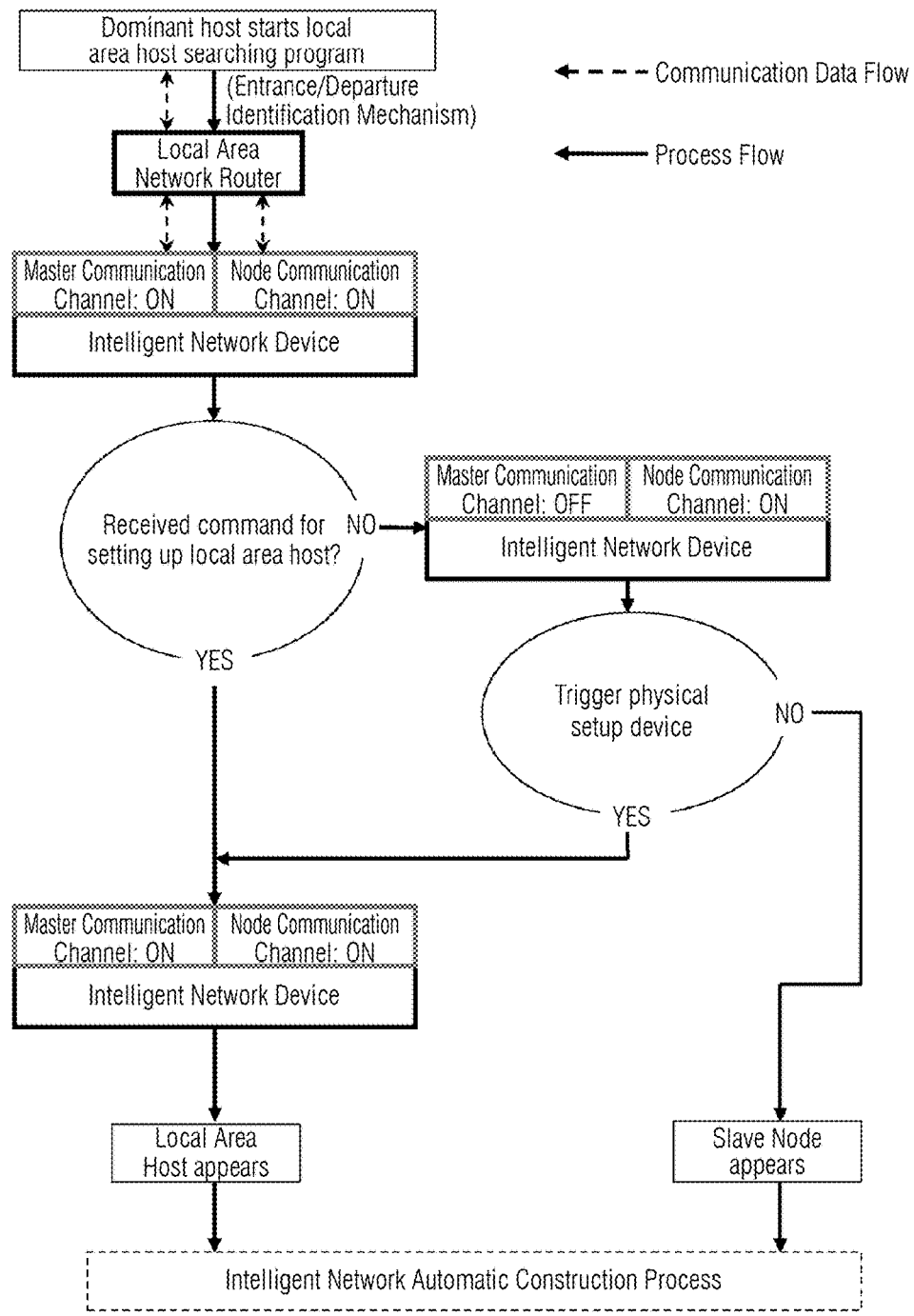
FIG. 3 shows a local area host construction flow according to an embodiment of the present invention.

FIG. 3 shows a local area host construction flow according to an embodiment of the present invention. According to the local area host setting process of the present embodiment, the dominant host in communication with the local area network router will perform a local area host searching program and send a dominant host beacon. Such dominant host beacon contains routing data of the local area network router. One or more intelligent network devices receive dominant host beacons sent from the dominant host, so as to login to the local area network router with the routing data contained in the dominant host beacons. When the intelligent network devices login to the local area router, the local area network router may allocate internet protocol addresses (IP addresses) for the intelligent network devices using, for example, Dynamic Host Configuration Protocol (DHCP). When setting up a single intelligent network device, a designation command may be sent through the dominant host to this intelligent network device for designating this intelligent network device as a local area host. Alternatively, this intelligent network device may be designated as a local area host by the manual switching of the manual master/slave mode switch of the intelligent network device (i.e., the "Trigger physical setup device" shown in FIG. 3). In the case of setting up only one intelligent network device, this intelligent network device may simultaneously be the local area host and the slave node. In the case of setting up a plurality of intelligent network devices, the designation command may be sent to one of the intelligent network devices through the dominant host to perform the designation of the local area host. Alternatively, by manually switching the manual master/slave mode switches of the intelligent network devices, one of the intelligent network devices can be designated as local area host. As described above, the master and node communication channels of the local area host are set to ON; while the master communication channel of the slave node is set to OFF, and the node communication channel thereof is set to ON.

According to an embodiment of the present invention, in a case that the dominant host is a portable dominant host (such as smart phones, smart watches, laptop computers, personal digital assistants, tablets, etc.), the dominant host enters the network range of a local area network router set up at home, and logins to the local area network router via, for example, Wireless Fidelity (Wi-Fi) protocol for accessing the routing data of the local area network router. At this time, the dominant host is in an entered state, which indicates an user carrying the dominant host has returned home. On the other hand, if the dominant host is out of the network range of the local area network router set up at home, and then logins to another local area network (such as local area networks of other communities, wide area 3G, 4G networks, etc.), the dominant host is in a departed status, which indicates that the user carrying the dominant host has left home. If the dominant host does not login to the local area network router set up at home and thus cannot access the routing data of the local area network router, the dominant host beacon sent from the dominant host will not include the routing data of the local area network router. Therefore, the intelligent network device cannot login to the local area router.

After the local area host construction flow shown in FIG. 3 is completed, the local area host and the slave nodes can be defined. Next, an automatic intelligent network deployment flow is performed.

Figure 4:
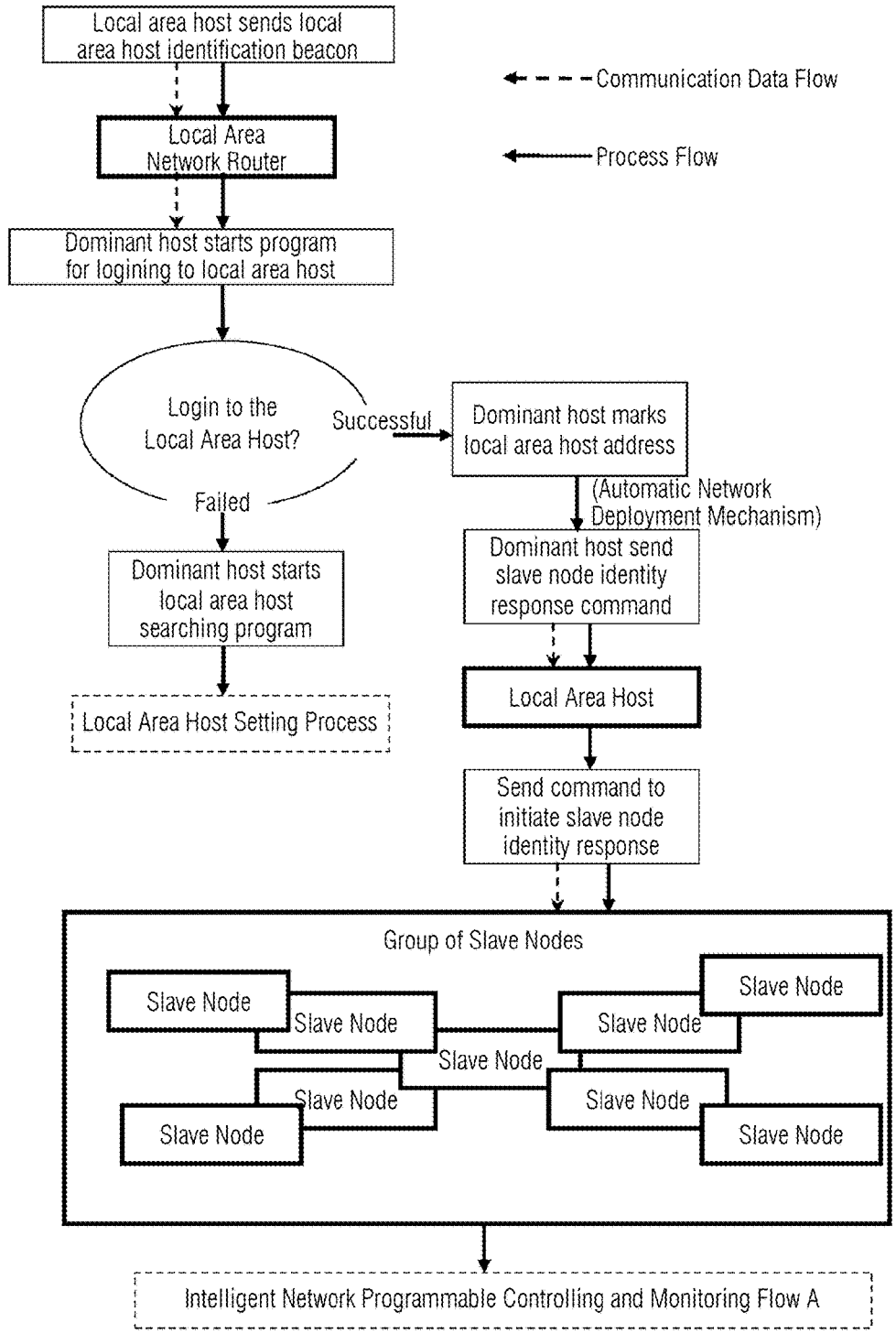
FIG. 4 shows an automatic intelligent network deployment flow according to an embodiment of the present invention.

FIG. 4 shows the automatic intelligent network deployment flow according to an embodiment of the present invention. According to the automatic intelligent network deployment of this embodiment, the local area host sends a local area host identification beacon. The local area host identification beacon contains the IP address of the current local area host, the device functional attributes of the local area host itself and so on. Then, the dominant host receives the local area host identification beacon, and further uses the received IP address of the local area host as a local area host login address to login to this local area host. In an embodiment of the present invention, the data of the designated local area host (IP address, device functional attributes, etc.) may be stored in advance in the dominant host. Next, the dominant host further uses this IP address as a local area host login address and logins to this local area host. When logining to the local area host, the dominant host sends data containing the device authorization code of the local area host to the local area host as a login authentication. If the local area host login procedure fails, the dominant host will run a local area host searching procedure again for perform the local area host construction flow shown in FIG. 3. If the local area host login procedure is successful, the dominant host will mark the address of the local area host, and send a slave node identity response command to the local area host. At this point, if slave nodes exist, after receiving the slave node identity response command sent from the dominant host, the local area host will send the slave node identity response command to all slave nodes. Next, after receiving the slave node identity response command, the slave nodes will send slave node status messages to the local area host, then the slave node status messages are sent back to the dominant host via the local area host. In this manner, an automatic network deployment mechanism can be accomplished. The purpose of the automatic network deployment mechanism is to investigate the quantity and identity of the slave nodes present in the network domain where the local area host is located. Once the dominant host has logined to the local area host, it can keep being in connection with the local area host via the local area network router. The slave node status response command sent from the dominant host may contain device authorization codes of the slave nodes, and so on. Next, intelligent network programmable controlling and monitoring flows (FIG. 5 and FIG. 6) are performed.

Figure 5:
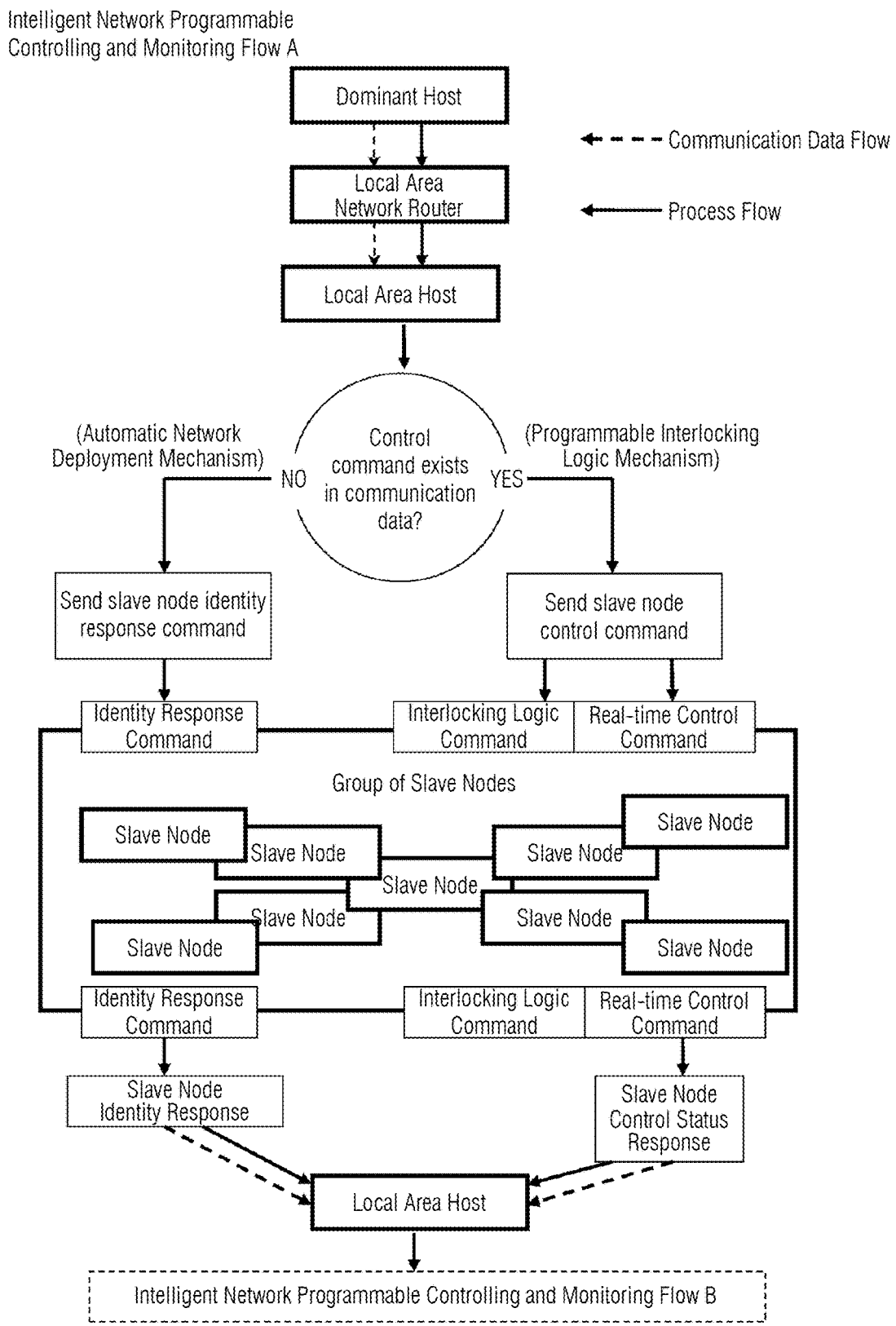
FIG. 5 shows an intelligent network programmable controlling and monitoring flow A according to an embodiment of the present invention.

FIG. 5 shows an intelligent network programmable controlling and monitoring flow A according to an embodiment of the present invention. In accordance with the intelligent network programmable controlling and monitoring flow A of the present embodiment, communication data (i.e., network data) may be transmitted to the local area host via the dominant host, then the local area host distributes this communication data to all slave nodes. If the communication data contains control commands, the control commands will be executed when the local area host and/or slave nodes determine that the communication data is valid and relevant. In the case that the control command is executed by a slave node, after executing the control command, the slave node sends an executing status message to the local area host, then the local area host sends the executing status message of the slave node to the dominant host. On the other hand, in the case that the control command is executed by the local area host, after executing the control command, the local area host similarly sends an execution status message to the dominant host. Such control command may be a common real-time control command or an interlocking logic command. In the case that the control command is an interlocking logic command, if the user has set up, via the dominant host, the interlocking executive relationship among electrical appliances and/or detection devices connected to the local area host or the slave nodes, the electrical appliances and/or detection devices connected to the local area host or the slave nodes may be controlled in an interlocking manner when the local area host or the slave nodes execute the interlocking logic command. Therefore, it is possible to enable the interlocking relationship among the electrical appliances and/or detection devices which are not physically related, such as, but not limited to, performing the interlocking operation of lights, microwave ovens, and smoke sensor, the interlocking operation of the surveillance cameras and electric door locks, the interlocking operation of thermometer and air conditioning systems, etc.

If the communication data belongs to a slave node identity response command and does not contain any control command, a slave node status message will be sent to the dominant host when the slave node determines that the communication data is valid and relevant.

In addition, the characteristic of the flexible network of the present invention is that, in addition to the flexibility of designating a local area host, the increase/decrease, appear/disappear of slave nodes at any time will not affect the operation of the entire network system due to the following reason. The dominant host may continuously send commands, via the local area host, for requesting the slave nodes to report their identities and current status, and a slave node will be considered disappear when the local area host receives an invalid response (or no response) of said slave node to the command.

According to an embodiment of the present invention, in a case that the dominant host is a portable dominant host (such as smart phones), when an user carrying the dominant host returns home (that is, enters the network connection range of the local area network router set up at home) from outside (i.e., another local area network, such as local area networks of other communities, wide area 3G, 4G networks, etc.), the dominant host is switched to the local area network in which it is located, and vice versa. Therefore, the dominant host may determine the entered (return home) state and departed (away from home) state of the user based on the network switching of the dominant host to a local area network in which the dominant host is located. In this manner, when the dominant host is switched to a local area network in which the dominant host is located, the dominant host can automatically send control commands to the local area host.

Figure 6:
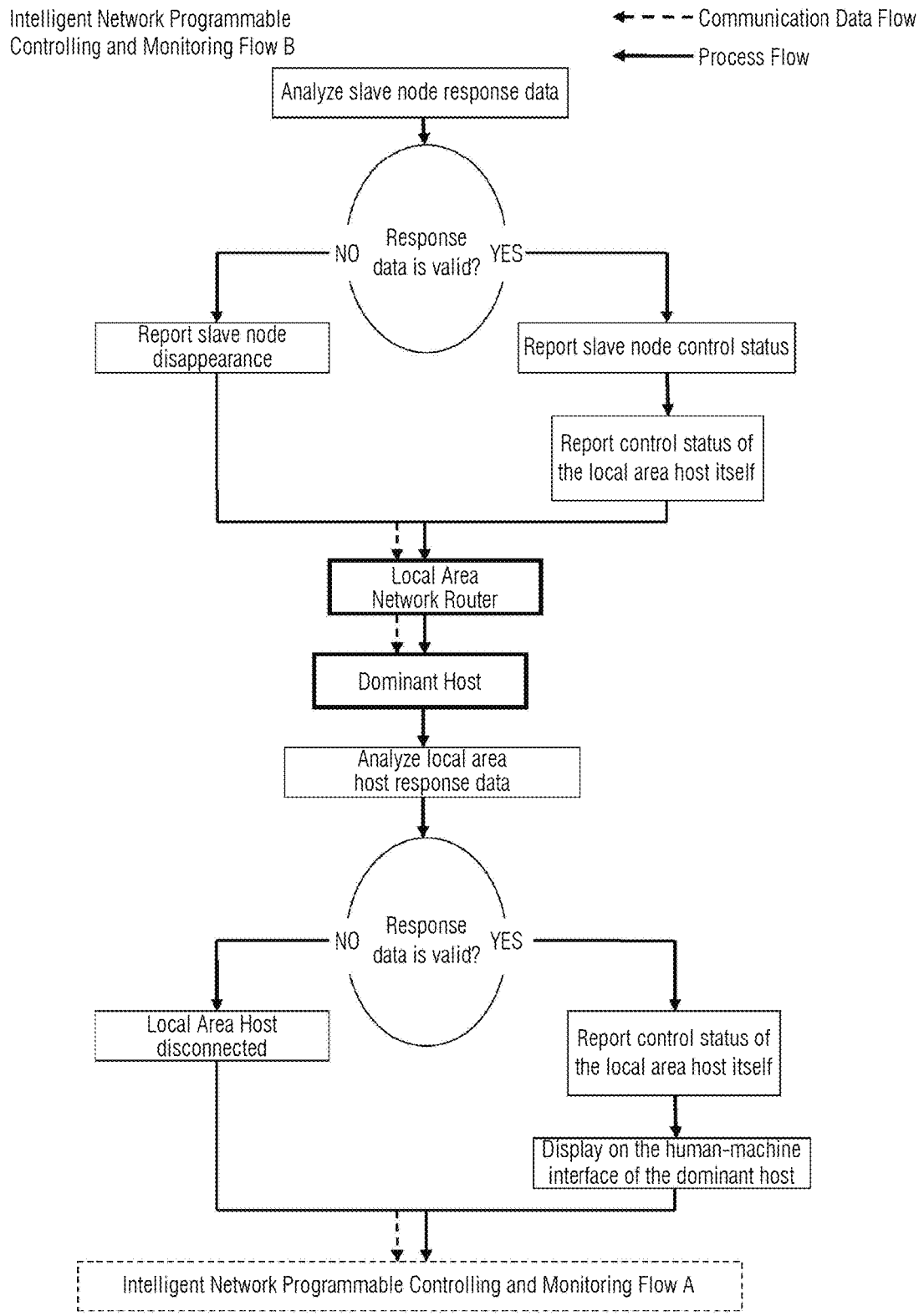
FIG. 6 shows an intelligent network programmable controlling and monitoring flow B according to an embodiment of the present invention.

FIG. 6 shows an intelligent network programmable controlling and monitoring flow B according to an embodiment of the present invention. In accordance with the intelligent network programmable controlling and monitoring flow B of the present embodiment, when the local area host receives response data (such as slave node status messages, executing status messages, etc.) from the slave nodes, the local area host will be analyze the response data to determine whether the response data is valid. For example, the local area host can determine whether the response data is valid based on the check code, source IP, etc., contained in the response data. In the case of the automatic network deployment mechanism, the local area host sends slave node identity response command, such that all slave nodes report their identities. At this time, the local area host does not identify the target IP of the source of response packets from the slave nodes, but only performs determination of check codes. If the response data is determined to be invalid, the local area host reports to the dominant host that the slave node disappears (i.e., connection is failed). If the response data is determined to be valid, the local area host reports to the dominant host the controlling status of the slave node and the controlling status of the local area host itself.

In an embodiment of the present invention, the local area host is in a state of waiting for the reply of a target slave node after the local area host sent a specific slave node identity response command or a control command from the dominant host to the target slave node. If the local area host does not receive the response data from the target slave node after a predetermined time period, the local area host will report to the dominant host that the connection of the target slave node is failed.

After receiving the response data from the local area host, the dominant host analyzes the response data to check if it is valid. For example, the dominant host determines whether the response data is valid with reference to the source IP, check code, etc. contained in the response data. If the response data is determined to be invalid, the local area host is considered disconnected, and the dominant host may trigger an alarm (e.g., sounds, text messages, etc.) to alert the user. If the response data is determined to be valid, the dominant host reports the control status of the local area host itself, and displayed such control status on the human-machine interface of the dominant host. The two flow charts respectively shown in FIG. 5 and FIG. 6 may be connected with each other to form an endless loop.

Unlike conventional smart home systems which require specific, dedicated central server hosts to handle all operations of device identification and instruction transmission, the characteristic of the present invention is that no specific, dedicated central server host is required. In other words, there is no intrinsic and constant master/slave distinction in the software (firmware) and hardware of the intelligent network devices of the present invention, so each intelligent network device may be randomly designated as a local area host or a slave node according to the need of a user. For the present invention, when an intelligent network device used as the local area host is failed, the user may assign another intelligent network device as the new local area host, so as to resolve the problem of entire system failure caused by the loss of a specific and dedicated central server host in conventional smart home systems. In addition, the central server host of conventional smart home systems is difficult to maintain, and the procedure for modifying the setting of the central server host may only be performed with the help of people in this professional field or specialized dedicated devices.

In addition, when the intelligent network devices of the present invention is moved in a cross-domain manner, they can be fully compatible with the operation in the new network domain because they do not depend on a specific, dedicated central server host. Thus, the intelligent network devices can be controlled by different dominant hosts loaded with identical dominant program software and located within the network domain within which the intelligent network devices are located. As a consequence, the intelligent network devices of the present invention have excellent compatibility and mobility. According to the present invention, an user without any related technical background may easily establish a desired form of smart home, as long as dominant hosts loaded with identical dominant program software are employed.

Another characteristic of the present invention is that, unlike conventional smart home systems in which registration operations have to be performed in advance through specific, dedicated central server hosts (and thus there are various assistive registration devices or means in such systems), the present invention uses "global two-way protocol resolution", that is, all communication data among the intelligent network devices themselves (i.e., among slave nodes, or between the slave nodes and the local area host) and among the intelligent network devices and the dominant host can be received by all the intelligent network devices (the local area host and the slave nodes), so it is called "global". Therefore, the intelligent network devices may receive invalid commands which are irrelevant to the intelligent network devices themselves but contain eligible check code and authorization code, and this is where flexible applications are focused on. Also, because the local area host sends commands regardless of the presence of any certain slave node, the increase/decrease or appear/disappear of slave nodes will not have any impact on the operation of the entire network system.

Additionally, in the present invention, each of the intelligent network devices in the same local area network is provided with a node communication channel. If any intelligent network device determines that the data transmitted on this node communication channel is valid and relevant, it executes the content of this data, and after the processing of the programs corresponding to such content has finished, this intelligent network device may actively report the processing result thereof to the dominant host, so as to form a "two-way communication".

Furthermore, in the present invention, each of the intelligent network devices in the same local area network is provided with a node communication channel. Data packets transmitted by any intelligent network device on this node communication channel have the same protocol format, so that all intelligent network devices use the same data analysis program, which is called "protocol resolution". Therefore, any intelligent network device may perform analyses, with respect to data present on the node communication channel of this intelligent network device, for verifying the source and destination of data transmission (to determine whether the data is relevant to intelligent network device itself), resolve contents of control commands (to determine which processing procedure is to be taken subsequently), etc.

Another feature of the present invention is: triggering control commands through an entrance/departure identification mechanism for portable dominant hosts (e.g., existing smart phones, smart watches, etc.). Normally, if the dominant host is successfully and automatically switched to a different network domain, it is common that such switching is directly related to an action of changing a user's geographic location performed by the user. For example, in the case that an user departs away from home, the dominant host carried by the user will be out of the communication range of local area network set up at home, and automatically join other remote networks (such as local area networks of other communities, wide area 3G, 4G networks, etc.). In this case, the dominant host can determine that the user has left home (i.e., departed) based on the change in network domain information of the login address of the dominant host. On the contrary, in the case that the user returns home, the dominant host carried by the user will enter the communication range of local area network set up at home, then automatically leave other remote networks (such as local area networks of other communities, wide area 3G, 4G networks, etc.) and join this local area network. In this case, the dominant host can determine that the user has returned home (i.e., entered) based on the change in network domain information of the login address of the dominant host. Accordingly, the present invention uses the determination of entrance/departure switching (successful switching and logining to a network domain) of the dominant host as a trigger signal, thereby triggering the automatic execution of responses of the smart home network which are requested by the dominant host when the dominant host is in its entered condition and departed condition, respectively. For example, when the dominant host leaves home, the smart home system automatically turns off all lights, locks all doors, windows, etc., and activates an indoor surveillance system; when the dominant host returns home, the smart home system automatically turns on lights, unlock doors, windows, etc., deactivates the indoor surveillance systems, turns on air conditioners, and so on.

The present invention does not require a specific, dedicated central server host for storing any automatic response program in advance, and all intelligent network devices of the present invention are innately the same in that they can be randomly designated as the local area host or a slave node by the user. Therefore, unlike other systems requiring specific, dedicated central server hosts, it is not necessary to store entrance/departure intelligent response programs in the intelligent network devices of the present invention in advance. According to the present invention, the user may dispose the required entrance/departure intelligent response mechanism in a portable dominant host, and control the intelligent network devices with the dominant host.

Another feature of the present invention is that, without a specific, dedicated central server host, electrical appliances and detection devices which are not physically relevant can still have interlocking relationship with each other. For example, the user may perform remote, flexible, and real-time setting with the dominant host for executing desired interlocking logical operations between switches, (digital or analog) interlocking logical operations between switches and detectors, and/or interlocking logical operations between switches and human (such as the aforementioned automatic entrance/departure intelligent response). As described above, for all intelligent network devices of the present invention, it is not necessary to store programmable logical processing procedures therein in advance. According to the present invention, the user may set up the programmable logical processing procedures of the intelligent network devices in a programmable manner with the dominant host. For conventional systems requiring specific, dedicated central server hosts, when the user wishes to change the logical response relationship within the smart home network, such setting of the logical response relationship can only be done with the assistance of people in this professional field or specialized dedicated devices.

Although the present invention has been described in detail with reference to the preferred embodiments and drawings, those with ordinary skill in the art may understand that various modifications, changes, and equivalents can be made without departing from the spirit and scope of the present invention. However, these modifications, changes, and equivalents should also be included in the scope of the present invention.

The invention claimed is:

1. A flexible network building method for remote-programmable monitoring and controlling system applied to smart home, the remote-programmable monitoring and controlling system comprising a plurality of intelligent network devices, a local area network router, and a dominant host in communication with the local area network router, the method comprising:
   sending a dominant host beacon via the dominant host, wherein the dominant host beacon contains router connection data for the local area network router;
   all of the plurality of intelligent network devices receiving the dominant host beacon sent from the dominant host, so as to login to the local area network router using the router connection data, wherein each of the plurality of intelligent network devices has a master communication channel and a node communication channel;
   randomly designating one of the plurality of intelligent network devices as a local area host, and designating the other ones of the plurality of intelligent network devices as slave nodes, wherein the master communication channel and node communication channel of the local area host are set to ON, the node communication channels of the slave nodes are set to ON, the master communication channels of the slave nodes are set to OFF, and wherein the communication resolution between the local area host and the slave nodes is made via the node communication channels by way of polling or broadcasting call signs;
   the dominant host logining to the local area host, such that the dominant host marks the address of the local area host, and sends a slave node identity response command to the local area host, wherein the local area host is in communication with the dominant host via the master communication channel;
   using the local area host to receive the slave node identity response command sent from the dominant host, and then send the slave node identity response command to all of the intelligent network devices; and
   after receiving the slave node identity response command, the slave nodes responding to the dominant host with slave node status messages via the local area host.

2. The method of claim 1, wherein the master communication channels are TCP communication protocol channels.

3. The method of claim 1, wherein the node communication channels are UDP communication protocol channels.

4. The method of claim 1, wherein randomly designating one of the plurality of intelligent network devices as a local area host comprises:
   sending a designation command to one of the plurality of intelligent network devices via the dominant host, so as to accomplish the designation of the local area host.

5. The method of claim 1, wherein each of the plurality of intelligent network devices has a manual master/slave mode switch, and randomly designating one of the plurality of intelligent network devices as a local area host comprises:
   manually switching the manual master/slave mode switches of the plurality of intelligent network devices to perform designation of the local area host to one of the plurality of intelligent network devices.

6. The method of claim 1, wherein the plurality of intelligent network devices are respectively connected to one or more electrical appliances and/or one or more detection devices.

7. The method of claim 6, further comprising:
   setting up the interlocking relationship among the one or more electrical appliances and/or the one or more detection devices in a programmable manner.

8. The method of claim 1, further comprising:
   sending a control command to the local area host via the dominant host;
   the local area host receiving the control command and sending the control command to all of the slave nodes;
   the local area host and all of the slave nodes determining whether the control command is valid according to the content of the control command, wherein:
   the control command will be ignored if it is determined to be invalid, or
   if the control comment is determined to be valid, the local area host and all of the slave nodes further determine whether the control command is relevant to themselves according to the content of the control command; and when the local area host and all of the slave nodes further
determine whether the control command is relevant to
themselves according to the content of the control
command,
the control command will be ignored if it is determined
to be irrelevant to the local area host and all of the
slave nodes, or
the content of the control command is executed if the
control command is determined to be relevant to at
least one of the local area host and all of the slave
nodes.

9. The method of claim 2, further comprising:
sending a control command to the local area host via the
dominant host;
the local area host receiving the control command and
sending the control command to all of the slave nodes;
the local area host and all of the slave nodes determining
whether the control command is valid according to the
content of the control command, wherein:
the control command will be ignored if it is determined
to be invalid, or
if the control comment is determined to be valid, the
local area host and all of the slave nodes further
determine whether the control command is relevant
to themselves according to the content of the control
command; and
when the local area host and all of the slave nodes further
determine whether the control command is relevant to
themselves according to the content of the control
command,
the control command will be ignored if it is determined
to be irrelevant to the local area host and all of the
slave nodes, or
the content of the control command is executed if the control
command is determined to be relevant to at least one of the
local area host and all of the slave nodes.

10. The method of claim 3, further comprising:
sending a control command to the local area host via the
dominant host;
the local area host receiving the control command and
sending the control command to all of the slave nodes;
the local area host and all of the slave nodes determining
whether the control command is valid according to the
content of the control command, wherein:
the control command will be ignored if it is determined
to be invalid, or
if the control comment is determined to be valid, the
local area host and all of the slave nodes further
determine whether the control command is relevant
to themselves according to the content of the control
command; and
when the local area host and all of the slave nodes further
determine whether the control command is relevant to
themselves according to the content of the control
command,
the control command will be ignored if it is determined
to be irrelevant to the local area host and all of the
slave nodes, or
the content of the control command is executed if the control
command is determined to be relevant to at least one of the
local area host and all of the slave nodes.

11. The method of claim 4, further comprising:
sending a control command to the local area host via the
dominant host;
the local area host receiving the control command and
sending the control command to all of the slave nodes;
the local area host and all of the slave nodes determining
whether the control command is valid according to the
content of the control command, wherein:
the control command will be ignored if it is determined
to be invalid, or
if the control comment is determined to be valid, the
local area host and all of the slave nodes further
determine whether the control command is relevant
to themselves according to the content of the control
command; and
when the local area host and all of the slave nodes further
determine whether the control command is relevant to
themselves according to the content of the control
command,
the control command will be ignored if it is determined
to be irrelevant to the local area host and all of the
slave nodes, or
the content of the control command is executed if the control
command is determined to be relevant to at least one of the
local area host and all of the slave nodes.

12. The method of claim 5, further comprising:
sending a control command to the local area host via the
dominant host;
the local area host receiving the control command and
sending the control command to all of the slave nodes;
the local area host and all of the slave nodes determining
whether the control command is valid according to the
content of the control command, wherein:
the control command will be ignored if it is determined
to be invalid, or
if the control comment is determined to be valid, the
local area host and all of the slave nodes further
determine whether the control command is relevant
to themselves according to the content of the control
command; and
when the local area host and all of the slave nodes further
determine whether the control command is relevant to
themselves according to the content of the control
command,
the control command will be ignored if it is determined
to be irrelevant to the local area host and all of the
slave nodes, or
the content of the control command is executed if the control
command is determined to be relevant to at least one of the
local area host and all of the slave nodes.

13. The method of claim 6, further comprising:
sending a control command to the local area host via the
dominant host;
the local area host receiving the control command and
sending the control command to all of the slave nodes;
the local area host and all of the slave nodes determining
whether the control command is valid according to the
content of the control command, wherein:
the control command will be ignored if it is determined
to be invalid, or
if the control comment is determined to be valid, the
local area host and all of the slave nodes further
determine whether the control command is relevant
to themselves according to the content of the control
command; and
when the local area host and all of the slave nodes further
determine whether the control command is relevant to
themselves according to the content of the control
command,
the control command will be ignored if it is determined
to be irrelevant to the local area host and all of the
slave nodes, or the content of the control command is executed if the control command is determined to be relevant to at least one of the local area host and all of the slave nodes.

14. The method of claim 7, further comprising:
sending a control command to the local area host via the dominant host;
the local area host receiving the control command and sending the control command to all of the slave nodes;
the local area host and all of the slave nodes determining whether the control command is valid according to the content of the control command, wherein:
the control command will be ignored if it is determined to be invalid, or
if the control comment is determined to be valid, the local area host and all of the slave nodes further determine whether the control command is relevant to themselves according to the content of the control command; and
when the local area host and all of the slave nodes further determine whether the control command is relevant to themselves according to the content of the control command,
the control command will be ignored if it is determined to be irrelevant to the local area host and all of the slave nodes, or
the content of the control command is executed if the control command is determined to be relevant to at least one of the local area host and all of the slave nodes.

15. The method of claim 8, wherein the dominant host is a portable dominant host, and sending a control command to the local area host via the dominant host comprises:
the dominant host automatically sending the control command to the local area host when the dominant host is switched to a local area network in which the dominant host is located.

16. The method of claim 8, wherein after the local area host and/or the slave nodes send an executing status message to the dominant host, after the control command has been executed.

17. The method of claim 8, wherein the step of the local area host and all of the slave nodes determining whether the control command is valid according to the content of the control command comprises:
the local host and all of the slave nodes examine check codes and/or device authorization codes contained in the control command to determine whether the control command is valid.

18. The method of claim 8, wherein the step of the local area host and all of the slave nodes determining whether the control command is relevant to themselves according to the content of the control command comprises:
the local host and all of the slave nodes examine destination IP address string contained in the control command to determine whether the control command is relevant to the local host and all of the slave nodes themselves.

* * * * *